(12) United States Patent
Mi et al.

(10) Patent No.: US 11,703,417 B1
(45) Date of Patent: Jul. 18, 2023

(54) HYDROGEN OVERFLOW AND EXHAUST GAS HYDROGEN TREATMENT UNIT OF A TEST SYSTEM OF A HYDROGEN INTERNAL COMBUSTION ENGINE VEHICLE

(71) Applicant: New Automobile Co., Ltd, Beijing (CN)

(72) Inventors: Shengrong Mi, Beijing (CN); Hai Li, Beijing (CN); Kaiyan Liang, Beijing (CN)

(73) Assignee: New Automobile Co., Ltd, Beijing (CN)

( * ) Notice: Subject to any disclaimer, the term of this patent is extended or adjusted under 35 U.S.C. 154(b) by 0 days.

(21) Appl. No.: 18/152,136

(22) Filed: Jan. 9, 2023

(30) Foreign Application Priority Data

Mar. 14, 2022 (CN) .......................... 202210244084.8

(51) Int. Cl.
*B01D 53/06* (2006.01)
*G01M 15/02* (2006.01)
*G01M 15/10* (2006.01)
*F16H 37/04* (2006.01)

(52) U.S. Cl.
CPC ............. *G01M 15/02* (2013.01); *B01D 53/06* (2013.01); *F16H 37/04* (2013.01); *G01M 15/102* (2013.01); *B01D 2257/108* (2013.01)

(58) Field of Classification Search
CPC . C01B 2203/04; C01B 2203/043; C01B 3/50; C01B 3/503; C01B 3/505; C01B 3/56; C01B 2203/0405; C01B 2203/0465; C01B 2203/047; C01B 2203/0475; C01B 2203/048; C01B 2203/0485; C01B 2203/0495; C01B 2203/146; C25B 15/085; B01D 53/226; B01D 53/228; B01D 53/326; B01D 53/047; B01D 2256/16; B01D 53/06; B01D 2257/108; G01M 15/02; G01M 15/102
See application file for complete search history.

(56) References Cited

U.S. PATENT DOCUMENTS 6,517,613 B1    2/2003  Schumm et al.
2017/0203275 A1*  7/2017  Yang ....................... C01B 3/042

FOREIGN PATENT DOCUMENTS

CN   202569897 U   12/2012
CN   112717656 A    4/2021
CN   112742173 A *  5/2021
(Continued)

*Primary Examiner* — Eric S. McCall
*Assistant Examiner* — Timothy P Graves

(57) ABSTRACT

A control test system of the hydrogen internal combustion engine vehicle microcomputer includes a hydrogen treatment unit; the hydrogen treatment unit includes a detection box; an absorption box, an impurity removal box, a purification box and a water storage tank are arranged on an outer wall of the detection box; a first spring is fixedly mounted on an upper wall of an inner cavity of the absorption box; a lower end of the first spring is fixedly connected with a piston plate which is in sliding connection with an inner wall of the absorption box; amounting cylinder is arranged on an upper wall of an inner cavity of the purification box; and a plurality of adsorption rods are arranged on an outer wall of the mounting cylinder in an annular array mode.

10 Claims, 8 Drawing Sheets

(56) References Cited

FOREIGN PATENT DOCUMENTS

| | | |
|---|---|---|
| CN | 112807961 A | 5/2021 |
| CN | 112933774 A | 6/2021 |
| CN | 213555456 U | 6/2021 |
| JP | 2000351611 A | 12/2000 |

* cited by examiner

HYDROGEN OVERFLOW AND EXHAUST GAS HYDROGEN TREATMENT UNIT OF A TEST SYSTEM OF A HYDROGEN INTERNAL COMBUSTION ENGINE VEHICLE

CROSS REFERENCE TO RELATED APPLICATIONS

This application claims foreign priority of Chinese Patent Application No. 202210244084.8, filed on Mar. 14, 2022 in the China National Intellectual Property Administration, the disclosures of all of which are hereby incorporated by reference.

TECHNICAL FIELD

The present invention relates to the technical field of adjusting systems, and particularly relates to a control test system of a hydrogen internal combustion engine vehicle microcomputer.

BACKGROUND OF THE PRESENT INVENTION

An internal combustion engine is a power machine, and is a heat engine which enables fuel to be combusted in a machine and directly converts the heat released by the fuel into power. Hydrogen does not contain carbon, and does not generate $CO_2$ after combustion. Hydrogen can be obtained through renewable energy sources such as solar energy, wind energy, hydrogen production through water electrolysis, hydrogen production through biomass, industrial waste hydrogen and hydrogen production through fossil fuel. Hydrogen is excellent internal combustion engine alternative fuel and is considered as an ideal energy source or energy source carrier. Hydrogen serving as the fuel of the internal combustion engine extremely easily realizes lean combustion, and has few pollutants and high heat efficiency. After a hydrogen internal combustion engine is produced and machined, it is needed to perform various tests such as various performance tests, hydrogen injection tests and power performance tests on the hydrogen internal combustion engine, and therefore corresponding data are obtained to facilitate subsequent research and production and guarantee subsequent normal operation.

Chinese invention patent with publication number of CN113325777A discloses a power control system of a double-piston opposed internal combustion engine test platform. The power control system includes a motor and a gear box driven by the motor, the gear box is used for providing two output shafts with opposite rotation directions, and the output shafts are connected with a crank slider mechanism through a coupling; the crank slider mechanism is capable of converting the rotation acting on a crank into the linear motion of a slider, and the slider is a piston of a tested double-piston opposed internal combustion engine. According to the present invention, when the internal combustion engine runs and encounters circumstances such as poor scavenging effect, fuel injection pulsation circulation, poor combustion effect, and knocking, the fluctuation caused by piston motion will be subjected to energy compensation by the power control system in real time, thus the piston of the internal combustion engine can stably run in a given motion trajectory, and the stable running condition of the internal combustion engine can be simulated for a long time.

However, when the internal combustion engine, especially the hydrogen internal combustion engine, is subjected to running test by a test apparatus at present, hydrogen may overflow when the hydrogen is input into the internal combustion engine, and part of hydrogen or other impurity emissions might be discharged when the internal combustion engine exhausts. At present, only ventilation is carried out, which cannot achieve good treatment. In case of a large number of tests or a long time of test, there will be more hydrogen and other emissions in the air, which has great influence on human health and environment, easily causes explosion and is low in safety. Moreover, the overflowing hydrogen or mixed emissions are not treated and recovered, which causes great waste and is not environmentally friendly and energy-saving.

Therefore, it is necessary to provide a control test system of a hydrogen internal combustion engine vehicle microcomputer to solve above technical problems.

SUMMARY OF PRESENT INVENTION

A purpose of the present invention is to provide a control test system of a hydrogen internal combustion engine vehicle microcomputer to solve the problems that when a test apparatus provided in the background is used for testing a hydrogen internal combustion engine, part of hydrogen or other impurity emissions are discharged, which has great influence on human health and environment and is low in safety, and the hydrogen or other impurity emissions are not processed and recycled, which is not environmentally friendly and energy-saving.

In order to achieve above purpose, through cooperation of a driving mechanism and a first spring, a piston plate is capable of enabling hydrogen overflowing from the interior of a detection box and exhausted gas to enter an absorption box, so that the influence on human health and environment is greatly reduced, and the safety is high; and then the gas is subjected to preliminary impurity removal in an impurity removal box, and adsorption rods are capable of adsorbing some impurity tiny particles in the gas through a matching mechanism in a purification box, so that the purity of the subsequent gas is improved, and energy conservation and environmental protection of subsequent hydrogen recovery treatment are facilitated.

Based on the above idea, the present invention provides the following technical solution:

The control test system of the hydrogen internal combustion engine vehicle microcomputer includes a hydrogen treatment unit; the hydrogen treatment unit includes a detection box; an outer wall of the detection box is respectively provided with an absorption box, an impurity removal box, a purification box and a water storage tank; a gas inlet pipe is communicated between the absorption box and the detection box; a gas outlet pipe is communicated between the absorption box and the impurity removal box; a communicating pipe is communicated between a lower wall of the purification box and an upper wall of the impurity removal box; the impurity removal box and the water storage tank are communicated with each other; an upper wall of an inner cavity of the absorption box is fixedly provided with a first spring; a lower end of the first spring is fixedly connected with a piston plate which is in sliding connection with an inner wall of the absorption box; an upper end of the piston plate is provided with a movable rod which movably penetrates through an upper wall of the absorption box; an upper end of the absorption box is provided with a driving mechanism for driving the movable rod to move up and down; an upper wall of an inner cavity of the purification box is provided with a mounting cylinder; an outer wall of the mounting cylinder is provided with a plurality of adsorption rods which are arranged in an annular array mode; and a matching mechanism is arranged inside the mounting cylinder.

As a further solution of the present invention, the driving mechanism includes two supporting plates fixedly connected to an upper end of the absorption box; a rotating shaft is rotatably connected between the two supporting plates; a motor in driving connection with the rotating shaft is mounted on an outer wall of the supporting plate on the left side; a plurality of eccentric wheels are mounted on an outer wall of the rotating shaft; and a matching plate in sliding connection with the eccentric wheels is arranged at an upper end of the movable rod.

As a further solution of the present invention, the matching mechanism includes a matching rod rotatably connected with an upper wall of the purification box; first bevel gears meshed with each other are mounted at the upper end of the matching rod and the right end of the rotating shaft; the lower side of the matching rod extends into the mounting cylinder and is provided with a friction disc; and friction brushes in contact with the friction disc are mounted at the ends, located in the mounting cylinder, of the adsorption rods.

As a further solution of the present invention, a bearing plate is fixedly arranged on the front inner wall and the rear inner wall of the purification box; a rotating rod is rotationally connected to a middle part of the bearing plate; a plurality of connecting rods are arranged on an outer wall of the rotating rod in an annular array mode; the ends, away from the rotating rod, of the connecting rods are provided with adapter blocks which are in sliding fit with the inner wall of the purification box; an impurity sweeping box is arranged at the upper end of one connecting rod; and a linkage assembly for driving the rotating rod to rotate is arranged on the outer wall of the purification box.

As a further solution of the present invention, an impurity collecting groove is formed in the impurity sweeping box; an impurity sweeping brush mounted at a lower end of a top part of the impurity removing box is arranged above the impurity collecting groove; and an eliminating block is mounted on an inner wall of the impurity sweeping box.

As a further solution of the present invention, the linkage assembly includes a linkage rod which is rotatably connected with and penetrates through a side wall of the purification box; the end, located in the purification box, of the linkage rod and the lower end of the rotating rod are provided with second bevel gears which are meshed with each other; an incomplete gear is mounted at the other end of the linkage rod; and a transmission assembly matched with the incomplete gear is arranged on the water storage tank.

As a further solution of the present invention, the transmission assembly includes a second spring fixedly connected to an upper wall of an inner cavity of the water storage tank; a lower end of the second spring is fixedly connected with a floating plate in sliding attaching with an inner wall of the water storage tank; an upper end of the floating plate is fixedly connected with a first transmission plate and a second transmission plate; the ends, close to each other, of the first transmission plate and the second transmission plate are provided with transmission teeth; and the transmission teeth on two sides are alternately meshed with the incomplete gear.

As a further solution of the present invention, two through grooves are formed in an upper wall of the water storage tank; sliders are mounted on inner walls of the through grooves; outer walls of the first transmission plate and the second transmission plate are provided with a first sliding rail and a second sliding rail respectively; and the first sliding rail and the second sliding rail are in sliding connection with the sliders on the two sides respectively.

As a further solution of the present invention, a third bevel gear is arranged on an outer wall of a lower side of the matching rod; and fourth bevel gears meshed with the third bevel gear are mounted on outer walls of the ends, located in the mounting cylinder, of the adsorption rods.

As a further solution of the present invention, one-way valves are mounted in the gas inlet pipe and the gas outlet pipe; a valve is mounted in the communicating pipe; the upper wall of the purification box is communicated with a guide-out pipe; and an auxiliary filter plate is mounted in the purification box.

Compared with the prior art, the present invention has the following advantages:

Through the cooperation of the driving mechanism and the first spring, the piston plate moves up and down in a circulating and reciprocating mode; when the piston plate moves upwards, the internal volume of a space between the piston plate and a bottom part of the absorption box is increased; thus negative pressure is formed, so that the hydrogen overflowing from the interior of the detection box and exhausted gas can enter the absorption box, to avoid a situation that more hydrogen or other impurity emissions overflow when the hydrogen internal combustion engine is tested at present, and prevent the air environment and the human health from being influenced. Moreover, the control test of the internal combustion engine is prevented from being greatly influenced, and the use effect of the control test system is improved; when the piston plate moves downwards, the gas enters the impurity removal box, and the gas is subjected to preliminary impurity removal through water, and meanwhile, the hydrogen can flow to the position above the water level in the impurity removal box; the gas enters the purification box after the valve in the communicating pipe is opened; then the surfaces of the adsorption rods are charged through the matching mechanism; some impurity tiny particles in the gas in the purification box can be adsorbed on the surfaces of the adsorption rods; thus the gas can be further subjected to impurity removal and purification treatment; the purity of the subsequent gas is improved; and the subsequent gas recycling treatment is facilitated. Then the treated gas is guided out through the guide-out pipe, so that the waste of the hydrogen is greatly avoided, and the energy-saving and environment-friendly effects are achieved.

Figure 1:
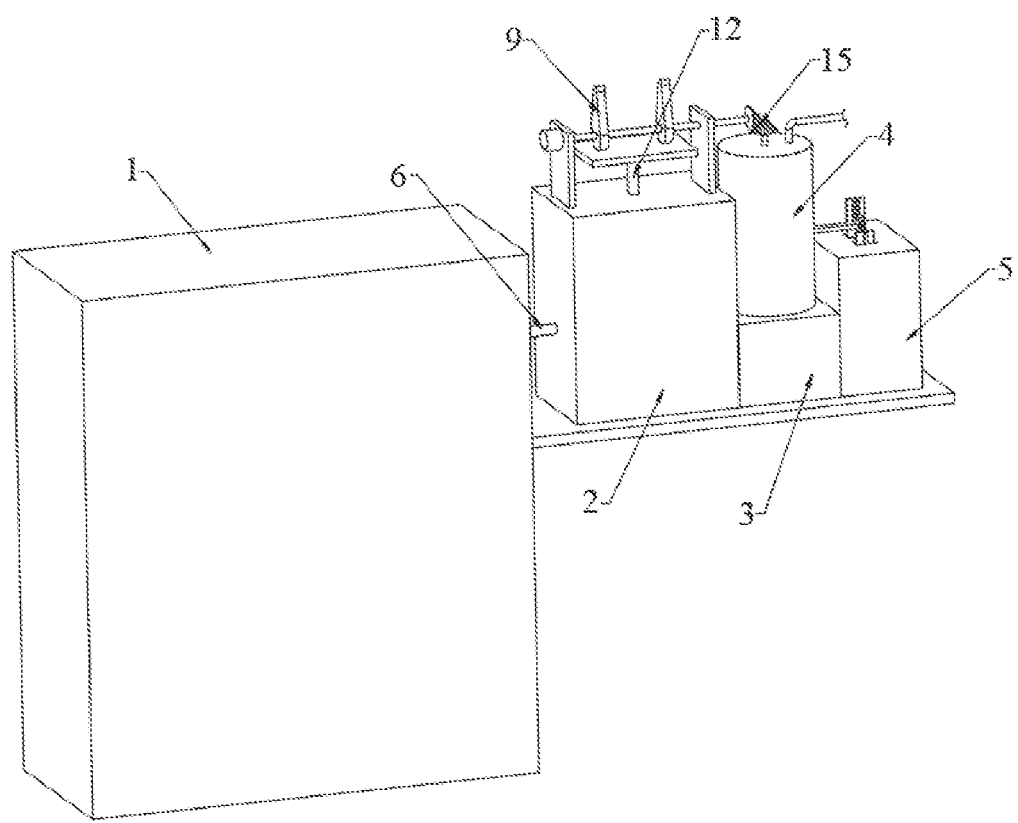
FIG. 1 is a three-dimensional structural schematic diagram of the present invention.

Description of Marks in the Figures:
1. detection box; 2, adsorption box; 3, impurity removal box; 4, purification box; 5, water storage tank; 6, gas inlet pipe; 7, gas outlet pipe; 8, communicating pipe; 9, driving mechanism; 901, supporting plate; 902, rotating shaft; 903, motor; 904, eccentric wheel; 905, matching plate; 10, first spring; 11, piston plate; 12, movable rod; 13, mounting cylinder; 14, adsorption rod; 15, matching mechanism; 1501, matching rod; 1502, first bevel gear; 1503, friction disc; 1504, friction brush; 16, bearing plate; 17, rotating rod; 18, connecting rod; 19, adapter block; 20, impurity sweeping box; 21, impurity collecting groove; 22, impurity sweeping brush; 23, eliminating block; 24, linkage rod; 25, second bevel gear; 26, incomplete gear; 27, second spring; 28, floating plate; 29, transmission plate; 30, second transmission plate; 31, transmission tooth; 32, through groove; 33, slider; 34, first sliding rail; 35, second sliding rail; 36, third bevel gear; 37, fourth bevel gear; and 38, auxiliary filter plate.

DETAILED DESCRIPTION OF PREFERRED EMBODIMENTS

Embodiment 1

As shown in FIGS. 1 to 3 and FIGS. 5 to 6, a control test system of a hydrogen internal combustion engine vehicle microcomputer includes a hydrogen treatment unit; the hydrogen treatment unit includes a detection box 1; an absorption box 2, an impurity removal box 3, a purification box 4 and a water storage tank 5 are respectively arranged on an outer wall of the detection box 1; a gas inlet pipe 6 is communicated between the absorption box 2 and the detection box 1; a gas outlet pipe 7 is communicated between the absorption box 2 and the impurity removal box 3; a communicating pipe 8 is communicated between a lower wall of the purification box 4 and an upper wall of the impurity removal box 3; the impurity removal box 3 is communicated with the water storage tank 5; a first spring 10 is fixedly mounted on an upper wall of an inner cavity of the absorption box 2; a lower end of the first spring 10 is fixedly connected with a piston plate 11 which is in sliding connection with an inner wall of the absorption box 2; a movable rod 12 which movably penetrates through an upper wall of the absorption box 2 is arranged at an upper end of the piston plate 11; a driving mechanism 9 for driving the movable rod 12 to lift is arranged at an upper end of the absorption box 2; a mounting cylinder 13 is arranged on an upper wall of an inner cavity of the purification box 4; a plurality of adsorption rods 14 are arranged on an outer wall of the mounting cylinder 13 in an annular array manner; a matching mechanism 15 is arranged in the mounting cylinder 13; one-way valves are mounted in the gas inlet pipe 6 and the gas outlet pipe 7; the one-way valve of the gas inlet pipe 6 is capable of enabling gas to enter the absorption box 2 from the detection box 1; otherwise, the gas cannot enter the adsorption box, and the one-way valve in the gas outlet pipe 7 is capable of only enabling the gas to enter the impurity removal box 3 from the absorption box 2; otherwise, the gas cannot enter the impurity removal box, so that the gas can be prevented from reflowing; a valve is mounted in the communicating pipe 8; an upper wall of the purification box 4 is communicated with a guide-out pipe; an auxiliary filter plate 38 is mounted in the purification box 4; and the auxiliary filter plate 38 has a further purification effect on hydrogen in recycled gas. When in use, the piston plate 11 moves up and down in a circulating and reciprocating manner through cooperation of the driving mechanism 9 and the first spring 10; when the piston plate 11 moves upwards, the volume of a space between the piston plate 11 and the absorption box 2 is increased to form negative pressure, and thus hydrogen overflowing from the interior of the detection box 1 and exhausted gas can enter the absorption box 2 through the gas inlet pipe 6, to avoid a situation that more hydrogen or other impurity emissions overflow when the hydrogen internal combustion engine is tested at present; safety is mainly ensured, and impurities are prevented from affecting the air environment and human health. When the piston plate 11 moves up and down, gas enters the impurity removal box 3, the gas is subjected to preliminary impurity removal through water firstly, meanwhile, hydrogen can flow to a position above the water level in the impurity removal box 3, and the water in the impurity removal box 3 can enter the water storage tank 5; and the water storage tank 5 can facilitate entering of the water, making contact with the gas, in the impurity removal box 3 and can also facilitate subsequent replacement of waste water in the water storage tank 5. The valve in the communicating pipe 8 is opened; the gas can enter the purification box 4 through the communicating pipe 8; then the surfaces of the adsorption rods 14 are charged through the matching mechanism 15; some impurity tiny particles in the gas in the purification box 4 can be adsorbed on the surfaces of the adsorption rods 14; and therefore impurity removal and purification treatment can be further carried out on the gas, so that the subsequent gas purity is improved, and subsequent hydrogen recycling treatment is facilitated. The treated gas is guided out through the guide-out pipe, therefore, waste of the hydrogen is greatly avoided, and energy conservation and environmental protection are achieved.

Figure 2:
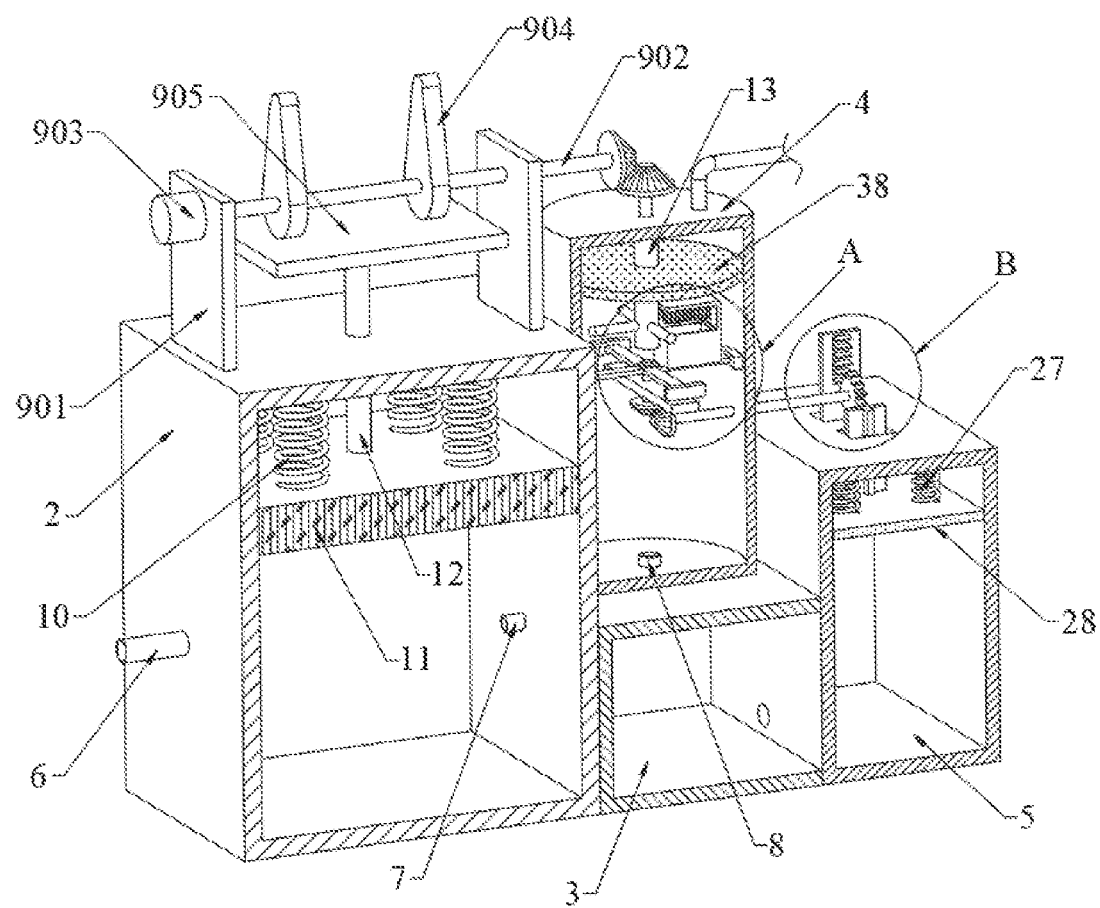
FIG. 2 is a sectional three-dimensional structural schematic diagram of an absorption tank, an impurity removal tank, a purification tank and a water storage tank of the present invention.
Figure 3:
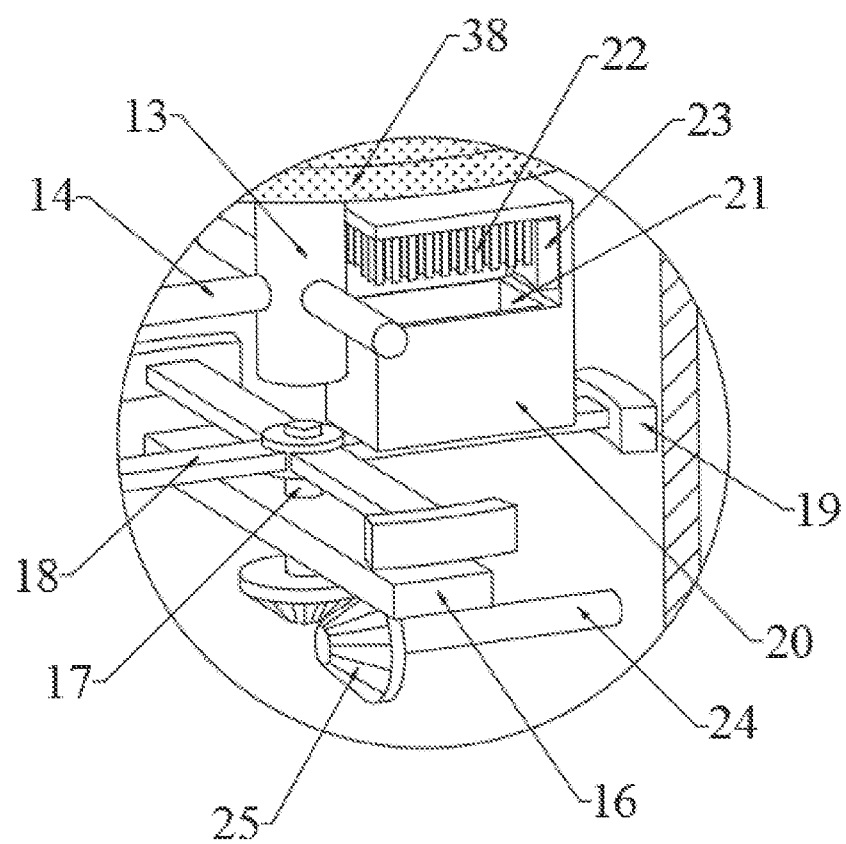
FIG. 3 is an amplified structural schematic diagram of a part A in FIG. 2.
Figure 4:
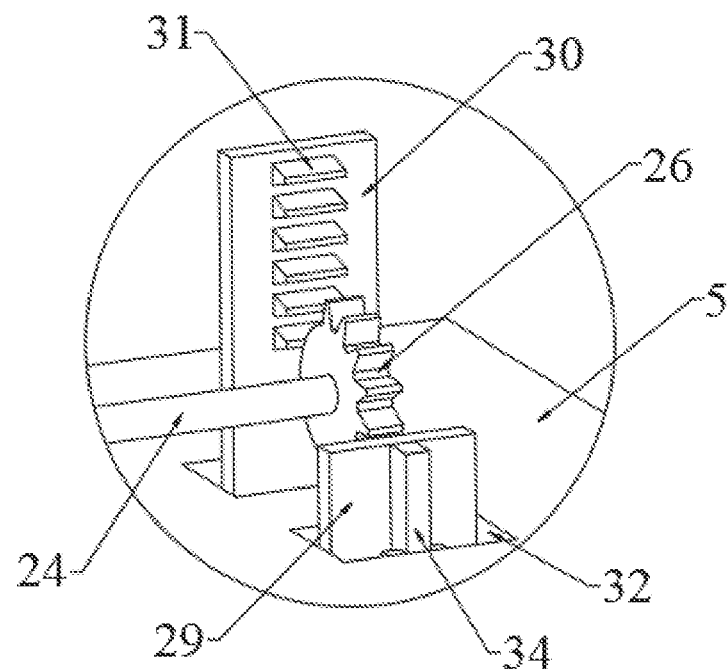
FIG. 4 is an amplified structural schematic diagram of a part B in FIG. 2.
Figure 5:
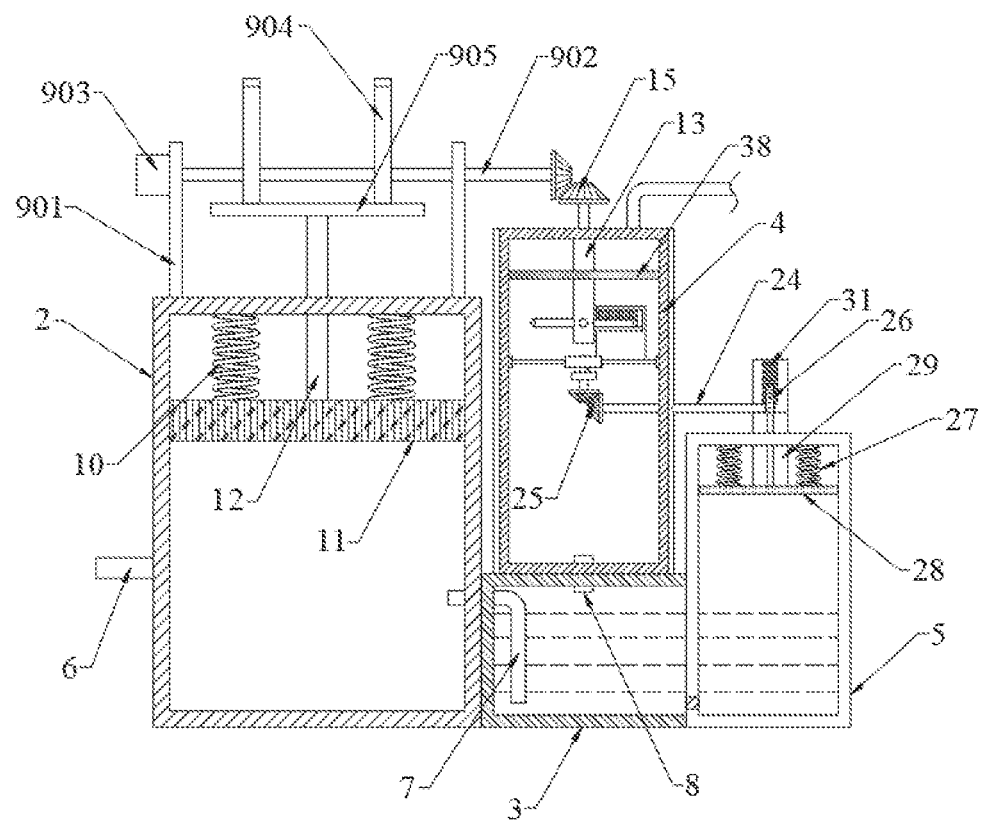
FIG. 5 is a front internal structural schematic diagram of an absorption tank, an impurity removal tank, a purification tank and a water storage tank of the present invention.

In this embodiment, preferably, as shown in FIG. 2 and FIG. 5, the driving mechanism 9 includes two supporting plates 901 fixedly connected to the upper end of the absorption box 2; a rotating shaft 902 is rotatably connected between the two supporting plates 901; a motor 903 in driving connection with the rotating shaft 902 is mounted on an outer wall of the supporting plate 901 on the left side; a plurality of eccentric wheels 904 are mounted on an outer wall of the rotating shaft 902; and a matching plate 905 in sliding connection with the eccentric wheels 904 is arranged at an upper end of the movable rod 12. The motor 903 is started to drive the rotating shaft 902 to rotate, the rotating shaft 902 is capable of driving the plurality of eccentric wheels 904 to rotate, and the eccentric wheels 904 can be matched with the matching plate 905 for action. At the beginning, long edges of the eccentric wheels 904 are located on the lower side, and the matching plate 905 and the movable rod 12 are extruded through the eccentric wheels 904. When the eccentric wheels 904 gradually rotate till the long edges face upwards, as shown in FIG. 2 and FIG. 5, then the piston plate 11, the movable rod 12 and the matching plate 905 can be driven to gradually move upwards through the action of the first spring 10; at the moment, the internal volume of the absorption box 2 is increased to form negative pressure, and thus hydrogen overflowing out of the detection box 1 and exhausted gas enter the absorption box 2 through the gas inlet pipe 6.

Figure 7:
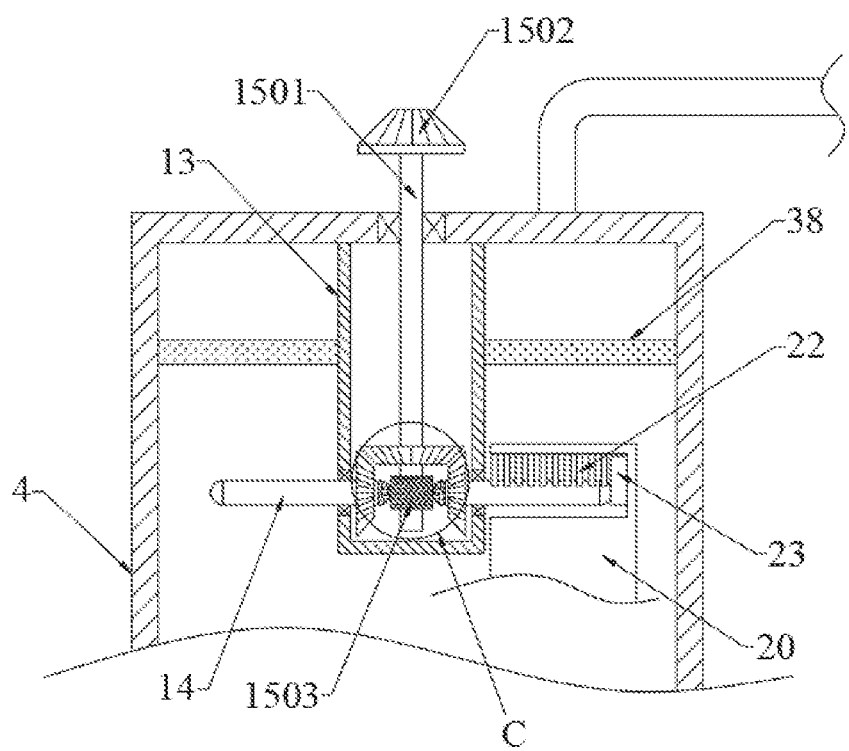
FIG. 7 is a sectional structural schematic diagram of a purification tank and a mounting cylinder of the present invention.
Figure 8:
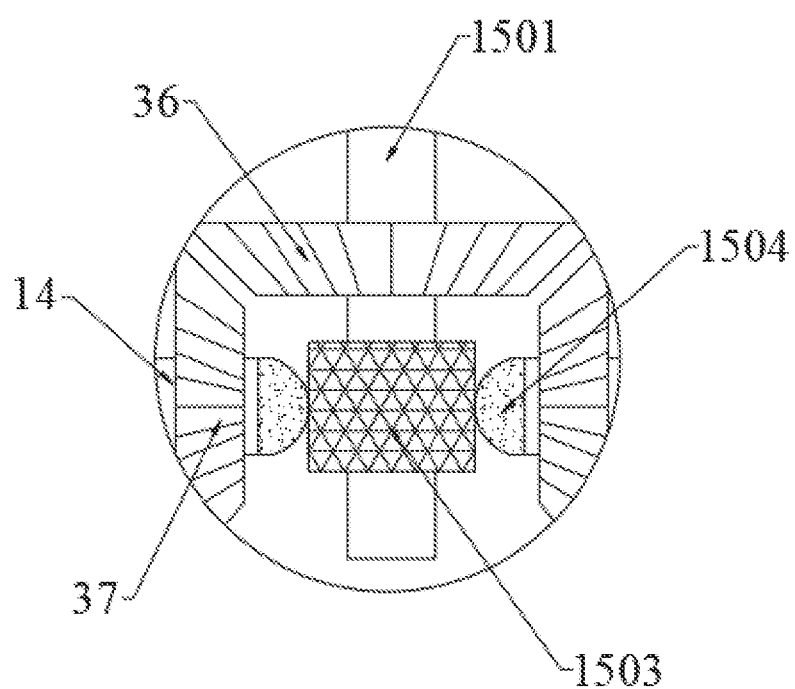
FIG. 8 is an amplified structural schematic diagram of a part C in FIG. 7.

In this embodiment, preferably, as shown in FIG. 5 and FIGS. 7-8, the matching mechanism 15 includes a matching rod 1501 rotatably connected with the upper wall of the purification box 4; an upper end of the matching rod 1501 and a right end of the rotating shaft 902 are provided with first bevel gears 1502 which are meshed with each other; a lower side of the matching rod 1501 extends into the mounting cylinder 13 and is provided with a friction disc 1503; and the ends, located in the mounting cylinder 13, of the adsorption rods 14 are provided with friction brushes 1504 making contact with the friction disc 1503. When the rotating shaft 902 rotates, the matching rod 1501 is driven to rotate through matching of the first bevel gears 1502, and the matching rod 1501 is capable of driving the friction disc 1503 to rotate; and the friction disc 1503 rotates to rub with the friction brushes 1504 on the adsorption rods 14 making contact with the periphery, thus the surfaces of the adsorption rods 14 can be charged, and some impurity tiny particles in gas can be adsorbed to the surfaces of the adsorption rods 14.

In this embodiment, preferably, as shown in FIG. 8, a third bevel gear 36 is arranged on an outer wall of the lower side of the matching rod 1501, and fourth bevel gears 37 meshed with the third bevel gear 36 are mounted on the outer walls of the ends, located in the mounting cylinder 13, of the adsorption rods 14. When the matching rod 1501 rotates, the third bevel gear 36 can be driven to rotate at the same time, the third bevel gear 36 is capable of driving the adsorption rods 14 to rotate through the fourth bevel gears 37, and therefore the adsorption rods 14 can independently rotate to drive the friction brushes 1504 to rub with the friction disc 1503 while the friction disc 1503 rotates to rub with the friction brushes 1504, and thus the friction effect is improved and the impurity particle adsorption effect is improved.

Embodiment 2

On the basis of the embodiment 1, as shown in FIGS. 3 to 6 and FIGS. 9 to 10, a bearing plate 16 is fixedly arranged on a front inner wall and a rear inner wall of the purification box 4; a rotating rod 17 is rotatably connected with a middle part of the bearing plate 16; a plurality of connecting rods 18 are arranged on an outer wall of the rotating rod 17 in an annular array manner; an adapter block 19 which is in sliding fit with an inner wall of the purification box 4 is mounted at one end, far away from the rotating rod 17, of each connecting rod 18; an impurity sweeping box 20 is mounted at an upper end of one connecting rod 18; and a linkage assembly for driving the rotating rod 17 to rotate is arranged on an outer wall of the purification box 4. The connecting rods 18, the adapter blocks 19 and the impurity sweeping box 20 have electrical conductivity; the outer wall of the purification box 4 is grounded, and the adapter blocks 19 are also grounded when being in contact with the outer wall of the purification box 4; an impurity collecting groove 21 is formed in the impurity sweeping box 20; an impurity sweeping brush 22 mounted at a lower end of a top part of the impurity sweeping box 20 is arranged above the impurity collecting groove 21; and an eliminating block 23 is mounted on an inner wall of the impurity sweeping box 20. The linkage assembly is capable of driving the rotating rod 17 to rotate, so that all the connecting rods 18 and the adapter blocks 19 can be driven to rotate, and the impurity sweeping box 20 on one adapter block 19 can also rotate together; and when the impurity sweeping box 20 rotates to reach one adsorption rod 14, the adsorption rod 14 can be in contact with the impurity sweeping brush 22 and the eliminating block 23 in the impurity sweeping box 20; the eliminating block 23 is electrically conductive and grounded, so that charges on the adsorption rod 14 can be removed; tiny impurity particles adsorbed on the adsorption rod 14 can fall into the impurity collecting groove 21 of the impurity sweeping box 20; the adsorption rod 14 is swept through the impurity sweeping brush 22; thus the impurity particles on the adsorption rod 14 are swept away; then the cleaning work of the adsorption rod 14 is realized; the influence on the performance of the adsorption rod 14 due to excessive adsorption of the impurity particles is avoided; and the treatment effect on impurities in gas can be greatly improved.

Figure 6:
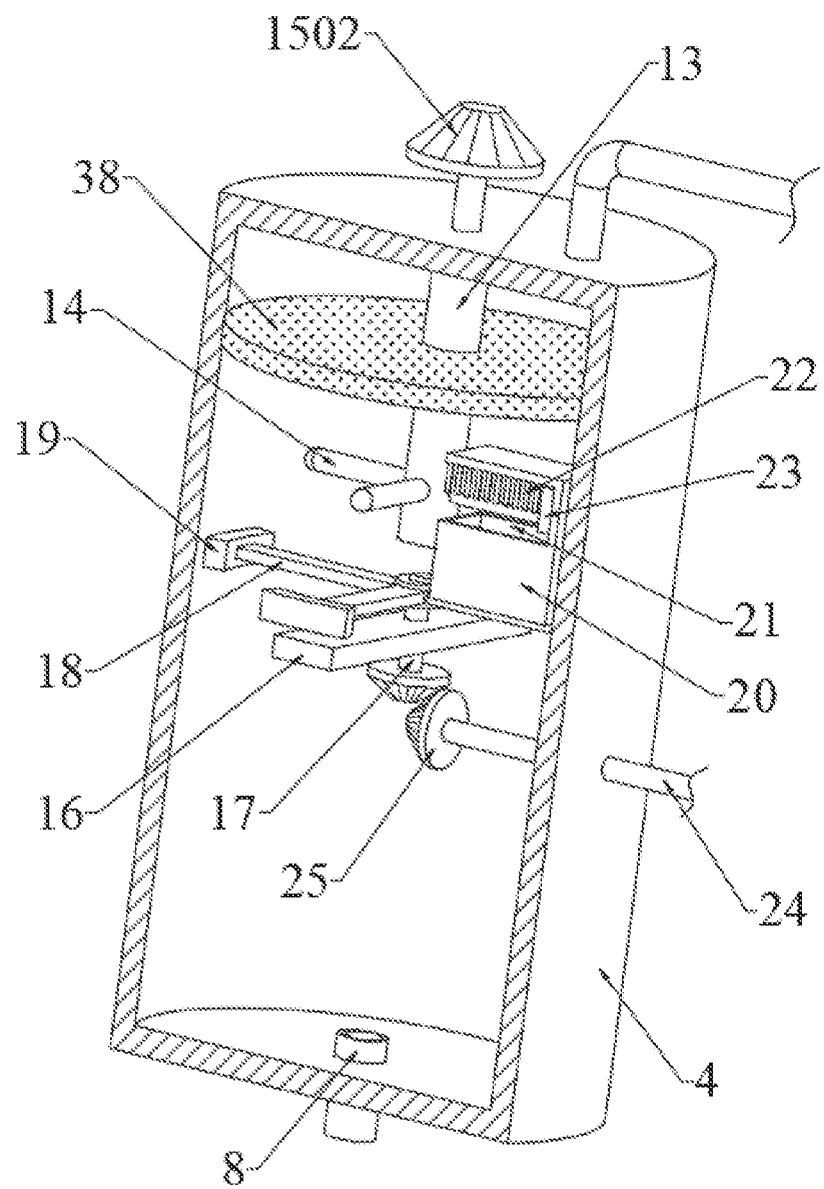
FIG. 6 is a three-dimensional structural schematic diagram of an interior of a purification tank of the present invention.
Figure 9:
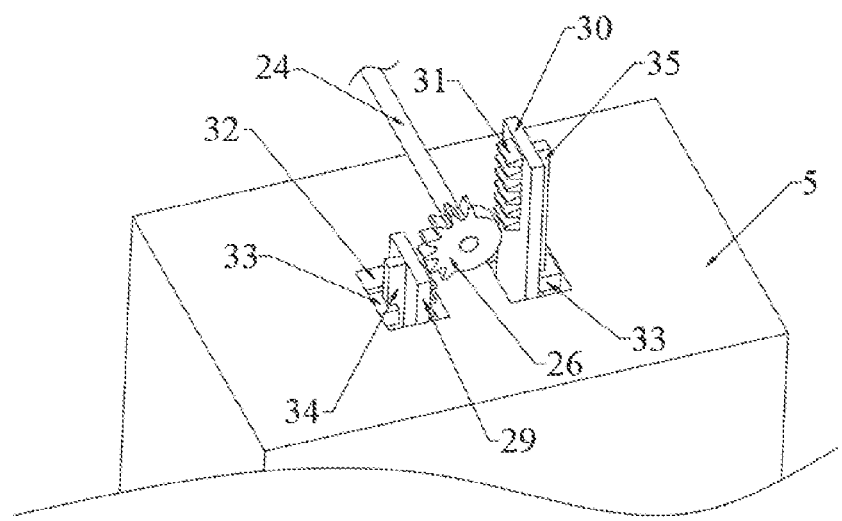
FIG. 9 is a local three-dimensional structural schematic diagram of a water storage tank of the present invention.
Figure 10:
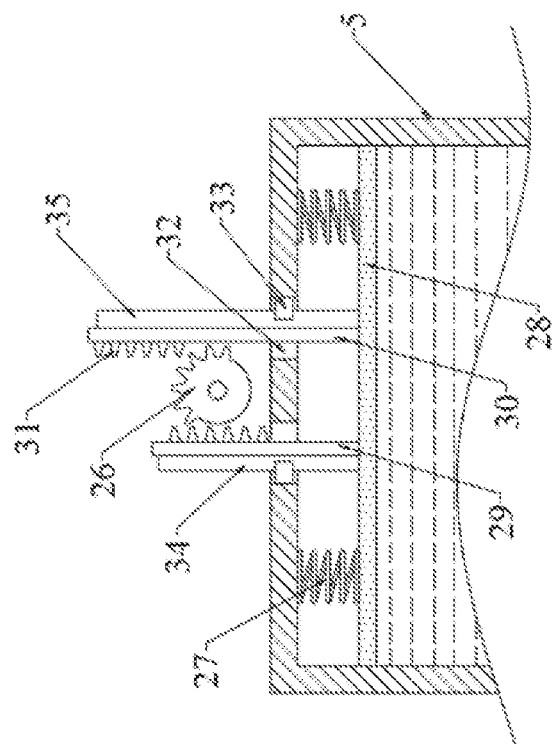
FIG. 10 is a structural schematic diagram of form change of a transmission assembly in a water storage tank of the present invention.
Figure 10:
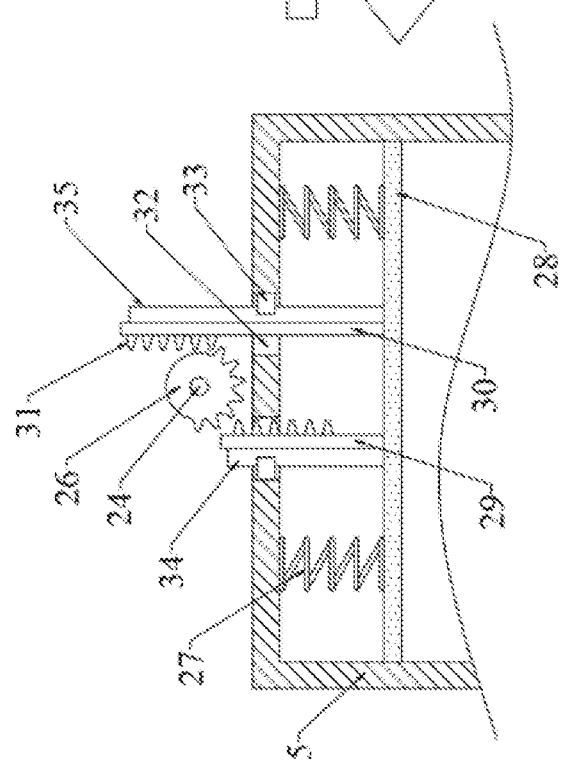

In this embodiment, preferably, as shown in FIG. 6 and FIGS. 9 to 10, the linkage assembly includes a linkage rod 24 which is rotatably connected with and penetrates through the side wall of the purification box 4; second bevel gears 25 which are meshed with each other are mounted at one end, positioned in the purification box 4, of the linkage rod 24 and the lower end of the rotating rod 17; an incomplete gear 26 is mounted at the other end of the linkage rod 24; and a transmission assembly matched with the incomplete gear 26 is arranged on the water storage tank 5. The transmission assembly includes a second spring 27 fixedly connected to the upper wall of the inner cavity of the water storage tank 5; a lower end of the second spring 27 is fixedly connected with a floating plate 28 which is in sliding fit with the inner wall of the water storage tank 5; the upper end of the floating plate 28 is fixedly connected with a first transmission plate 29 and a second transmission plate 30 respectively; transmission teeth 31 are arranged at the ends, close to each other, of the first transmission plate 29 and the second transmission plate 30; and the transmission teeth 31 on the two sides are alternately meshed with the incomplete gear 26. When water in the impurity removal box 3 enters the water storage tank 5 by virtue of gas, the water level in the water storage tank 5 can be gradually increased, so that the water in the water storage tank 5 can be in contact with the floating plate 28; finally the floating plate 28 is driven to move upwards; the second spring 27 is compressed; the floating plate 28 is capable of driving the first transmission plate 29 and the second transmission plate 30 to move upwards; the first transmission plate 29 can be meshed with the incomplete gear 26 through the transmission teeth 31 and drive the incomplete gear and the linkage rod 24 to rotate clockwise; and the linkage rod 24 rotates and can drive the rotating rod 17 to rotate through the second bevel gears 25.

After the valve in the communicating pipe 8 is opened, gas in the impurity removal box 3 enters the purification box 4, and water in the water storage tank 5 can return to the impurity removal box 3 again; after the water in the water storage tank 5 descends, the floating plate 28 will be driven to move downwards to return through the second spring 27; then the floating plate 28 is capable of driving the first transmission plate 29 and the second transmission plate 30 to move downwards;at the moment, transmission teeth 31 on the first transmission plate 29 are not meshed with the incomplete gear 26; the second transmission plate 30 can be meshed with the incomplete gear 26 through the transmission teeth 31 on the second transmission plate; the incomplete gear and the linkage rod 24 can be driven to continuously rotate clockwise, as shown in the FIG. 10; at the moment, the second bevel gears 25 are capable of driving the rotating rod 17 to rotate; then the impurity sweeping box 20 can be continuously rotated; and the impurity sweeping box 20 can gradually leave the adsorption rod 14 which is just cleaned, and is rotated to the next adsorption rod 14 for cleaning. Therefore, the adsorption rods 14 are cleaned in a circulating mode; the cleaning effect is good; the using effect of the adsorption rods 14 is improved; and the treatment effect on the gas exhausted by a hydrogen internal combustion engine is improved.

In this embodiment, preferably, as shown in FIGS. 9 to 10, two through grooves 32 are formed in the upper wall of the water storage tank 5; sliders 33 are installed on the inner walls of the through grooves 32; a first sliding rail 34 and a second sliding rail 35 are mounted on the outer wall of the first transmission plate 29 and the outer wall of the second transmission plate 30 respectively; and the first sliding rail 34 and the second sliding rail 35 are in sliding connection with the sliders 33 on the two sides respectively. When the floating plate 28 drives the first transmission plate 29 and the second transmission plate 30 to move up and down, the first transmission plate 29 and the second transmission plate 30 are capable of driving the sliders 33 to slide along the first sliding rail 34 and the second sliding rail 35 respectively; thus the moving stability of the first transmission plate 29 and the second transmission plate 30 can be improved; and then the stability of meshing transmission with the incomplete gear 26 is improved.

Working principle: when in use, a certain amount of water is filled in the impurity removal box 3 and the water storage tank 5, and the water level in the impurity removal box 3 and the water storage tank 5 is consistent because the impurity removal box 3 and the water storage tank 5 are communicated with each other. When the internal hydrogen internal combustion engine is tested through the test device in the detection box 1, the motor 903 can be started to drive the rotating shaft 902 to rotate; the rotating shaft 902 is capable of driving the plurality of eccentric wheels 904 to rotate, and the eccentric wheels 904 can be matched with the matching plate 905 to act. The long sides of the eccentric wheels 904 are arranged at the lower side initially, the matching plate 905 and the movable rod 12 are extruded through the eccentric wheels 904, and the first spring 10 is in a stretching state. When the eccentric wheels 904 gradually rotate until the long sides are upward, as shown in FIG. 2 and FIG. 5, the piston plate 11, the movable rod 12 and the matching plate 905 can be driven to gradually move upwards through the first spring 10, and at the moment, the volume of the space between the piston plate 11 and the bottom part of the absorption box 2 is increased to form negative pressure, and thus the overflowing hydrogen and the exhausted gas in the detection box 1 are enabled to enter the internal part of the absorption box 2 through the gas inlet pipe 6. Then the matching plate 905, the movable rod 12 and the piston plate 11 can be gradually driven to move downwards again along with rotation of the eccentric wheels 904 and the first spring 10 is stretched. The piston plate 11 moves downwards to discharge the absorbed gas in the absorption box 2 into the impurity removal box 3 through the gas outlet pipe 7. The gas cannot overflow from the gas inlet pipe 6 through the one-way valves so that overflowing of more hydrogen or other impurity emissions in testing the hydrogen internal combustion engine can be avoided.

After gas enters the impurity removal box 3, the gas is subjected to preliminary impurity removal through water; and meanwhile, hydrogen is insoluble in water and can flow to the position above the water level in the impurity removal box 3; the water level in the impurity removal box 3 is lower and lower along with increase of the gas; water can enter the water storage tank 5, and thus the water level in the water storage tank 5 is higher and higher. After the gas in the impurity removal box 3 reaches a certain amount, the valve in the communicating pipe 8 is opened, and the gas can enter the purification box 4 through the communicating pipe 8; because the rotating shaft 902 is capable of driving the matching rod 1501 to rotate through cooperation of the first bevel gear 1502 during rotation, the matching rod 1501 is capable of driving the friction disc 1503 to rotate and the friction disc 1503 rotates to rub with friction brushes 1504 on the adsorption rods 14 making contact with the periphery. Therefore, the surfaces of the adsorption rods 14 can be charged; and when the gas in the purification box 4 rises to the position near the adsorption rods 14, some impurity tiny particles in the gas can be adsorbed to the surfaces of the adsorption rods 14, and impurity removal and purification treatment can be further carried out on the gas. Then, the gas continues to rise to be subjected to further impurity removal and purification through an auxiliary filter plate 38, the purity of hydrogen is improved, and the treated gas is guided out through the guide-out pipe.

If the valve in the communicating pipe 8 is not opened, water in the impurity removal box 3 can enter the water storage tank 5 through the gas; the water level in the water storage tank 5 gradually rises; therefore the water in the water storage tank 5 can make contact with the floating plate 28; finally the floating plate 28 is driven to move upwards; the second spring 27 is compressed; and the floating plate 28 is capable of driving the first transmission plate 29 and the second transmission plate 30 to move upwards. The first transmission plate 29 can be meshed with the incomplete gear 26 through transmission teeth 31, and the incomplete gear and the linkage rod 24 are driven to rotate clockwise; the linkage rod 24 rotates to drive the rotating rod 17 to rotate through the second bevel gears 25; the rotating rod 17 is capable of driving all the connecting rods 18 and adapter blocks 19 to rotate, and therefore the impurity sweeping box 20 on one adapter block 19 can rotate along with the rotating rod 17; when the impurity sweeping box 20 rotates to one adsorption rod 14, the adsorption rod 14 can make contact with the impurity sweeping brush 22 and the eliminating block 23 in the impurity sweeping box 20, the eliminating block 23 is conductive and grounded to remove charges on the adsorption rod 14, tiny impurity particles adsorbed on the adsorption rod 14 can fall into the impurity collecting groove 21 of the impurity sweeping box 20, and the adsorption rod 14 is swept through the impurity sweeping brush 22. Thus, the impurity particles on the adsorption rod 14 are swept away, and the cleaning work of the adsorption rod 14 is achieved.

After the valve in the communicating pipe 8 is opened, gas in the impurity removal box 3 enters the purification box 4, and water in the water storage tank 5 can return to the impurity removal box 3 again. After the water in the water storage tank 5 descends, the floating plate 28 is driven to move downwards to return through the second spring 27, and then the floating plate 28 drives the first transmission plate 29 and the second transmission plate 30 to move downwards. At the moment, the transmission teeth 31 on the first transmission plate 29 on the left side are not meshed with the incomplete gear 26; when the second transmission plate 30 moves downwards, the second transmission plate 30 is meshed with the incomplete gear 26 through the transmission teeth 31 on the second transmission plate, so that the incomplete gear and the linkage rod 24 are driven to continuously rotate clockwise, as shown in the FIG. 10. At the moment, the second bevel gears 25 are capable of driving the rotating rod 17 to rotate, so that the impurity sweeping box 20 can continuously rotate. Then, the impurity sweeping box 20 can gradually leave the cleaned adsorption rod 14, and is rotated to the next adsorption rod 14 for cleaning. The adsorption rods 14 are cleaned in a circulating mode.

We claim:

1. A control test system of a hydrogen internal combustion engine vehicle microcomputer, comprising a hydrogen treatment unit, wherein the hydrogen treatment unit comprises a detection box; an outer wall of the detection box is respectively provided with an absorption box, an impurity removal box, a purification box and a water storage tank; a gas inlet pipe is communicated between the absorption box and the detection box; a gas outlet pipe is communicated between the absorption box and the impurity removal box; a communicating pipe is communicated between a lower wall of the purification box and an upper wall of the impurity removal box; the impurity removal box and the water storage tank are communicated with each other; an upper wall of an inner cavity of the absorption box is fixedly provided with a first spring; a lower end of the first spring is fixedly connected with a piston plate which is in sliding connection with an inner wall of the absorption box; an upper end of the piston plate is provided with a movable rod which movably penetrates through an upper wall of the absorption box; an upper end of the absorption box is provided with a driving mechanism for driving the movable rod to move up and down; an upper wall of an inner cavity of the purification box is provided with a mounting cylinder; an outer wall of the mounting cylinder is provided with a plurality of adsorption rods which are arranged in an annular array mode; and a matching mechanism is arranged inside the mounting cylinder.

2. The control test system of the hydrogen internal combustion engine vehicle microcomputer according to claim 1, wherein the driving mechanism comprises two supporting plates fixedly connected to an upper end of the absorption box; a rotating shaft is rotatably connected between the two supporting plates; a motor in driving connection with the rotating shaft is mounted on an outer wall of the supporting plate on the left side; a plurality of eccentric wheels are mounted on an outer wall of the rotating shaft; and a matching plate in sliding connection with the eccentric wheels is arranged at an upper end of the movable rod.

3. The control test system of the hydrogen internal combustion engine vehicle microcomputer according to claim 2, wherein the matching mechanism comprises a matching rod rotatably connected with an upper wall of the purification box; first bevel gears meshed with each other are mounted at the upper end of the matching rod and the right end of the rotating shaft; the lower side of the matching rod extends into the mounting cylinder and is provided with a friction disc; and friction brushes in contact with the friction disc are mounted at the ends, located in the mounting cylinder, of the adsorption rods.

4. The control test system of the hydrogen internal combustion engine vehicle microcomputer according to claim 1, wherein a bearing plate is fixedly arranged on the front inner wall and the rear inner wall of the purification box; a rotating rod is rotationally connected to a middle part of the bearing plate; a plurality of connecting rods are arranged on an outer wall of the rotating rod in an annular array mode; the ends, away from the rotating rod, of the connecting rods are provided with adapter blocks which are in sliding fit with the inner wall of the purification box; an impurity sweeping box is arranged at the upper end of one connecting rod; and a linkage assembly for driving the rotating rod to rotate is arranged on the outer wall of the purification box.

5. The control test system of the hydrogen internal combustion engine vehicle microcomputer according to claim 4, wherein an impurity collecting groove is formed in the impurity sweeping box; an impurity sweeping brush mounted at a lower end of a top part of the impurity removing box is arranged above the impurity collecting groove; and an eliminating block is mounted on an inner wall of the impurity sweeping box.

6. The control test system of the hydrogen internal combustion engine vehicle microcomputer according to claim 4, wherein the linkage assembly comprises a linkage rod which is rotatably connected with and penetrates through a side wall of the purification box; the end, located in the purification box, of the linkage rod and the lower end of the rotating rod are provided with second bevel gears which are meshed with each other; an incomplete gear is mounted at the other end of the linkage rod; and a transmission assembly matched with the incomplete gear is arranged on the water storage tank.

7. The control test system of the hydrogen internal combustion engine vehicle microcomputer according to claim 6, wherein the transmission assembly comprises a second spring fixedly connected to an upper wall of an inner cavity of the water storage tank; a lower end of the second spring is fixedly connected with a floating plate in sliding attaching with an inner wall of the water storage tank; an upper end of the floating plate is fixedly connected with a first transmission plate and a second transmission plate; the ends, close to each other, of the first transmission plate and the second transmission plate are provided with transmission teeth; and the transmission teeth on two sides are alternately meshed with the incomplete gear.

8. The control test system of the hydrogen internal combustion engine vehicle microcomputer according to claim 7, wherein two through grooves are formed in an upper wall of the water storage tank; sliders are mounted on inner walls of the through grooves; outer walls of the first transmission plate and the second transmission plate are provided with a first sliding rail and a second sliding rail respectively; and the first sliding rail and the second sliding rail are in sliding connection with the sliders on the two sides respectively.

9. The control test system of the hydrogen internal combustion engine vehicle microcomputer according to claim 3, wherein a third bevel gear is arranged on an outer wall of a lower side of the matching rod; and fourth bevel gears meshed with the third bevel gear are mounted on outer walls of the ends, located in the mounting cylinder, of the adsorption rods.

10. The control test system of the hydrogen internal combustion engine vehicle microcomputer according to claim 1, wherein one-way valves are mounted in the gas inlet pipe and the gas outlet pipe; a valve is mounted in the communicating pipe; the upper wall of the purification box is communicated with a guide-out pipe; and an auxiliary filter plate is mounted in the purification box.

* * * * *